United States Patent
Du et al.

(10) Patent No.: US 11,808,152 B2
(45) Date of Patent: Nov. 7, 2023

(54) METHOD FOR REAL-TIME STRENGTH ESTIMATION, GRADING, AND EARLY WARNING OF ROCK MASS IN TUNNEL BORING MACHINE (TBM) TUNNELING

(71) Applicants: Shijiazhuang Tiedao University, Shijiazhuang (CN); China State Railway Group Co., Ltd., Beijing (CN)

(72) Inventors: Lijie Du, Shijiazhuang (CN); Qingwei Li, Shijiazhuang (CN); Yalei Yang, Shijiazhuang (CN); Yong Zhao, Shijiazhuang (CN); Siming Tian, Shijiazhuang (CN)

(73) Assignees: SHIJIAZHUANG TIEDAO UNIVERSITY, Shijiazhuang (CN); CHINA STATE RAILWAY GROUP CO., LTD., Beijing (CN)

(*) Notice: Subject to any disclaimer, the term of this patent is extended or adjusted under 35 U.S.C. 154(b) by 0 days.

(21) Appl. No.: 18/104,831

(22) Filed: Feb. 2, 2023

(65) Prior Publication Data
US 2023/0258087 A1     Aug. 17, 2023

(30) Foreign Application Priority Data
Feb. 15, 2022   (CN) .......................... 202210138184.2

(51) Int. Cl.
*E21F 17/18*     (2006.01)
*E21D 9/00*     (2006.01)
(Continued)

(52) U.S. Cl.
CPC .............. *E21F 17/18* (2013.01); *E21D 9/003* (2013.01); *E21D 9/087* (2013.01); *E21F 17/185* (2013.01);
(Continued)

(58) Field of Classification Search
CPC .......... E21F 17/18; E21D 9/003; E21D 9/087; G01V 99/005
(Continued)

(56) References Cited

FOREIGN PATENT DOCUMENTS

KR         2019061302 A   *   6/2019   ............... E21D 9/06

OTHER PUBLICATIONS

Gholami, M., K. Shahriar, and J. Khademi Hamidi. "Predicting Hard Rock TBM Performance Using a Multiple Regression Analysis of RMR Classification System." 45th US Rock Mechanics/Geomechanics Symposium. OnePetro, 2011. pp. 1-8. (Year: 2011).*

(Continued)

*Primary Examiner* — John E Johansen
(74) *Attorney, Agent, or Firm* — Gregory Ozga; Warn Partners, P.C.

(57) ABSTRACT

A method for real-time strength estimation, grading, and early warning of rock mass in tunnel boring machine (TBM) tunneling, and belongs to the technical field of TBM tunnel construction. The method includes the following steps: establishing a general relation model of equivalent strength $R_{ec}$ of the TBM boring rock mass and a field penetration index (FPI); and applying the model to TBM boring construction, estimating an integrity coefficient $K_v$ of the TBM boring rock mass in real time according to boring parameters acquired by a TBM in real time, and performing grading and early warning on the TBM boring rock mass according to a given grading standard and early warning values.

5 Claims, 7 Drawing Sheets

(51) Int. Cl.
| | |
|---|---|
| *E21D 9/087* | (2006.01) |
| *G01V 99/00* | (2009.01) |
| *G06F 30/13* | (2020.01) |
| *G06F 30/20* | (2020.01) |
| *G06Q 10/0639* | (2023.01) |
| *G06F 119/14* | (2020.01) |

(52) U.S. Cl.
CPC ............ *G01V 99/005* (2013.01); *G06F 30/13* (2020.01); *G06F 30/20* (2020.01); *G06Q 10/06393* (2013.01); *G06F 2119/14* (2020.01)

(58) Field of Classification Search
USPC ........................................................ 703/6, 10
See application file for complete search history.

(56) References Cited

OTHER PUBLICATIONS

Hassanpour, Jafar, Jamal Rostami, and Jian Zhao. "A new hard rock TBM performance prediction model for project planning." Tunnelling and Underground Space Technology 26.5 (2011). pp. 595-603. (Year: 2011).*

Parsajoo, Maryam, et al. "An evolutionary adaptive neuro-fuzzy inference system for estimating field penetration index of tunnel boring machine in rock mass." Journal of Rock Mechanics and Geotechnical Engineering 13.6 (2021). pp. 1290-1299. (Year: 2021).*

Xu, Haiyan, et al. "Sub-level classification and prediction system of fully weathered red sandstone rock mass based on physical property indices." KSCE Journal of Civil Engineering 25 (2021). pp. 1066-1085. (Year: 2021).*

Yagiz, Saffet. "New equations for predicting the field penetration index of tunnel boring machines in fractured rock mass." Arabian Journal of Geosciences 10 (2017). pp. 1-13. (Year: 2017).*

Zhang, Zhaohuang, et al. "Theoretical prediction of wear of disc cutters in tunnel boring machine and its application." Journal of Rock Mechanics and Geotechnical Engineering 11.1 (2019). pp. 111-120. (Year: 2019).*

Zhang, Xiao-Ping, et al. "Evaluation of rock muck using image analysis and its application in the TBM tunneling." Tunnelling and Underground Space Technology 113 (2021). pp. 1-19. (Year: 2021).*

Wu, Zhijun, et al. "Real-time rock mass condition prediction with TBM tunneling big data using a novel rock-machine mutual feedback perception method." Journal of Rock Mechanics and Geotechnical Engineering 13.6 (2021). pp. 1311-1325. (Year: 2021).*

* cited by examiner (a) Project in Northeast China (b) Project HJ

METHOD FOR REAL-TIME STRENGTH ESTIMATION, GRADING, AND EARLY WARNING OF ROCK MASS IN TUNNEL BORING MACHINE (TBM) TUNNELING

CROSS REFERENCE TO RELATED APPLICATION

This patent application claims the benefit and priority of Chinese Patent Application No. 202210138184.2, filed with the China National Intellectual Property Administration on Feb. 15, 2022, the disclosure of which is incorporated by reference herein in its entirety as part of the present application.

TECHNICAL FIELD

The present disclosure belongs to the technical field of tunnel boring machine (TBM) tunnel construction, and in particular, to a method for real-time strength estimation, grading, and early warning of rock mass in TBM tunneling.

BACKGROUND

As important parameters representing the quality characteristics of rock mass, rock strength and rock mass integrity are the main judgment basis for engineering rock mass quality grading, and also important evaluation indexes for TBM boring performance. It is of great importance to quickly and accurately judge the rock strength and integrity of tunnel face in the field construction process. However, due to the limitations of the cutterhead and shield, TBM cannot directly observe the surrounding rock conditions on the tunnel face in the boring process. In addition, it is difficult to quickly conduct field test and evaluation of surrounding rock quality characteristics. At present, the traditional methods for testing rock strength and the methods for obtaining the integrity coefficient of rock mass are field sampling testing after boring, which belong to the post-shutdown behavior of TBM and are not real-time. Therefore, it is difficult to provide TBM with online identification and early warning of boring rock mass characteristics. There is a need to establish a real-time measurement method of rock mass strength and integrity coefficient according to changes of TBM boring parameters, so as to determine whether the rock mass is easy to bore and whether it is broken, and realize the real-time identification and early warning of the TBM boring rock mass conditions is of great significance for ensuring the safe and efficient boring of TBM and improving the intelligent level of TBM construction.

At present, the rock strength measurement model based on boring parameters is to establish the relationship between the strength of core rock and boring parameters, rather than the relationship between the strength of boring rock mass and boring parameters, ignoring the impact of rock integrity. In the process of TBM boring, the boring parameters actually reflect the strength of rock mass. For intact rock mass, the strength of rock mass is close to that of rock, and the prediction results of the model have high accuracy. For jointed rock mass, its strength is generally lower than rock strength due to the influence of rock mass integrity. The rock strength calculated based on the previous model and the field boring data is naturally different from the tested rock strength. Therefore, the calculation results of the model lack accuracy and its application has limitations.

In addition, the current commonly used tunnel surrounding rock grading method is mainly based on the stability of surrounding rock and targeted at the traditional drilling and blasting method, not TBM adaptive surrounding rock grading, and not online real-time intelligent grading. Intelligent identification and early warning of TBM boring rock mass are of great significance to timely judgment of rock mass boreability and prevention of sticking risk caused by collapse.

SUMMARY

An objective of the present disclosure is to provide a method for real-time strength estimation, grading, and early warning of rock mass in TBM tunneling, which aims to solve the technical problems that a rock strength measurement model based on boring parameters is not suitable for a jointed rock mass and has limitations, and a traditional grading method of tunnel surrounding rock is not applicable to TBM construction in the above prior art.

In order to solve the above technical problems, the technical solutions adopted by the present disclosure are as follows:

A method for real-time strength estimation, grading, and early warning of rock mass in TBM tunneling includes the following steps:

S1: establishing a general relation model of equivalent strength $R_{ec}$ of the TBM boring rock mass and a field penetration index (FPI) as follow:

$$R_{ec}=64.981n(FPI)-140.32 \quad \text{Formula (1)},$$

where a determination coefficient of Formula (1) is $R^2=0.9146$;

S2: applying the model in Formula (1) to TBM boring construction, calculating the FPI according to boring parameters acquired by a TBM of a project under construction in real time, calculating the equivalent strength $R_{ec}$ of the boring rock mass using the model in Formula (1), and estimating an integrity coefficient $K_v$ of the TBM boring rock mass combined with compressive strength of an intact rock mass of the project with same lithology measured by pre-sampling; and S3: performing grading and early warning on the TBM boring rock mass according to a given grading standard and early warning values based on the equivalent strength $R_{ec}$ and the integrity coefficient $K_v$ calculated using the model in Formula (1) in real time.

Further, the model in Formula (1) in step S1 are determined as follows:

S1.1: obtaining intact rock mass boring data and geological data of the TBM on site: acquiring the intact rock mass boring data and geological data of the TBM tunnel project under different tunnel diameter scales and different rock types, where the boring data includes cutterhead thrust and penetration which are used to calculate the FPI; and the geological data includes rock uniaxial compressive strength (UCS):

$$FPI = \frac{F}{n \cdot P}, \quad \text{Formula (2)}$$

where F is the cutterhead thrust, in kiloNewtons (kN); P is the penetration, in millimeters per rotation (mm/r); and n is a number of tools;

S1.2: acquiring measured intact rock mass data at a project site, and establishing a relation formula between the FPI and rock UCS using a mathematical regression method, so as to obtain a relation model of intact rock mass strength $R_c$ and the FPI:

$$R_c=64.981n(FPI)-140.32(R^2=0.9146) \quad \text{Formula (3); and}$$

S1.3: defining strength of the boring rock mass with difficulty of boring penetration equivalent to difficulty of boring penetration of an intact rock mass as the equivalent strength $R_{ec}$ of the TBM boring rock mass (suitable for both the intact rock mass and the jointed rock mass), that is, obtaining the model in Formula (1).

Further, step S2 includes the following sub-steps:

S2.1: calculating the FPI of the boring rock mass according to the boring parameters acquired by a TBM data acquisition system of the project under construction in real time, and substituting the FPI calculated by Formula (2) into Formula (1) to obtain the equivalent strength $R_{ec}$ of the TBM boring rock mass; and S2.2: estimating the integrity coefficient $K_v$ of the TBM boring rock mass in real time in a tunnel section with same lithology:

$$K_v=R_{ec}/R_c \quad \text{Formula (4),}$$

where $R_{ec}$ is the equivalent strength of the rock mass calculated according to the model in Formula (1), and $R_c$ is strength of the intact rock mass of the project with same lithology measured by pre-sampling.

Further, the grading standard and the early warning values are as follows.

When the equivalent strength $R_{ec}$ of the rock mass is greater than 150 MPa, a second-level early warning value of extremely hard surrounding rock is given.

When the equivalent strength $R_{ec}$ of the rock mass is greater than 200 MPa, a first-level early warning value of extremely hard surrounding rock is given.

When the equivalent strength $R_{ec}$ of the rock mass is less than 30 MPa and the integrity coefficient $K_v$ is less than 0.35, a second-level early warning value of weak and broken surrounding rock is given.

When the equivalent strength $R_{ec}$ of the rock mass is less than 15 MPa and the integrity coefficient $K_v$ is less than 0.35, a first-level early warning value of weak and broken surrounding rock is given.

Further, TBM boring rock mass grading and early warning are as follows.

When $R_{ec}$ is 30-150 MPa, a surrounding rock grade is B-I, penetration is easy with a low risk, and no early warning is required.

When $R_{ec}$ is 150-200 MPa, or $R_{ec}$ is 15-30 MPa and $K_v$ is less than 0.35, a surrounding rock grade is B-II, penetration is difficult or a risk of breakage is high, and a second-level early warning is given.

When $R_{ec}$ is greater than 200 MPa, or $R_{ec}$ is less than 15 MPa and $K_v$ is less than 0.35, a surrounding rock grade is B-III, penetration is extremely difficult or a risk of breakage is very high, and a first-level early warning is given.

The beneficial effect of the above technical solution is: compared with the prior art, the present disclosure can estimate the equivalent strength and the integrity coefficient of the TBM boring rock mass online according to changes of the boring parameters of the TBM without an on-site sampling and testing, and understand boreability and a degree of breakage of the TBM boring rock mass in real time and intuitively. In addition, the method can perform real-time graded identification and early warning of the TBM boring rock mass through the equivalent strength and the integrity coefficient of the rock mass estimated by the model. Compared with a traditional TBM construction surrounding rock grading method, the method has advantages that adopted grading index parameters are simple and easily available online. In addition, the method is of great importance to timely judgment of boreability of surrounding rock, early warning of a risk that the TBM is stuck due to rock mass collapse, and advance preparation of proper supporting measures.

BRIEF DESCRIPTION OF THE DRAWINGS

The present disclosure is described in further detail below with reference to the drawings and specific implementations.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

Figure 1:
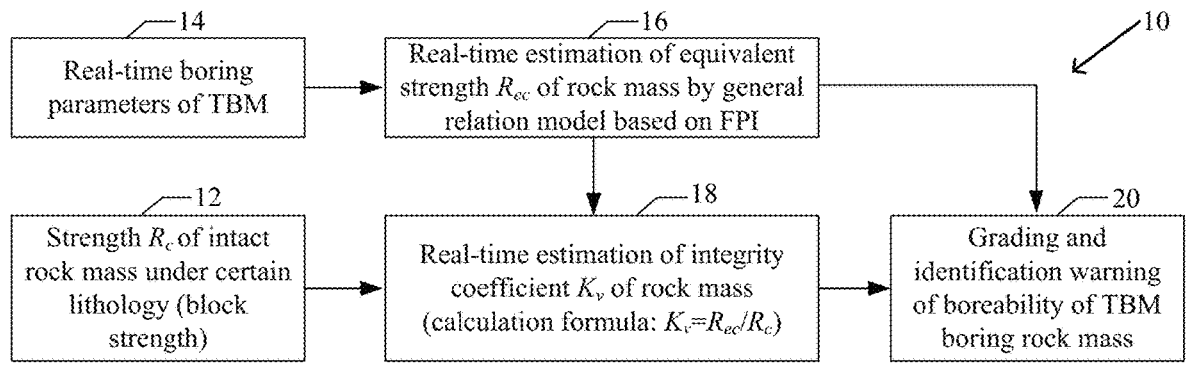
FIG. 1 is a flow chart of a method for real-time strength estimation, grading, and early warning of rock mass in TBM tunneling provided by the present disclosure.
Figure 2:
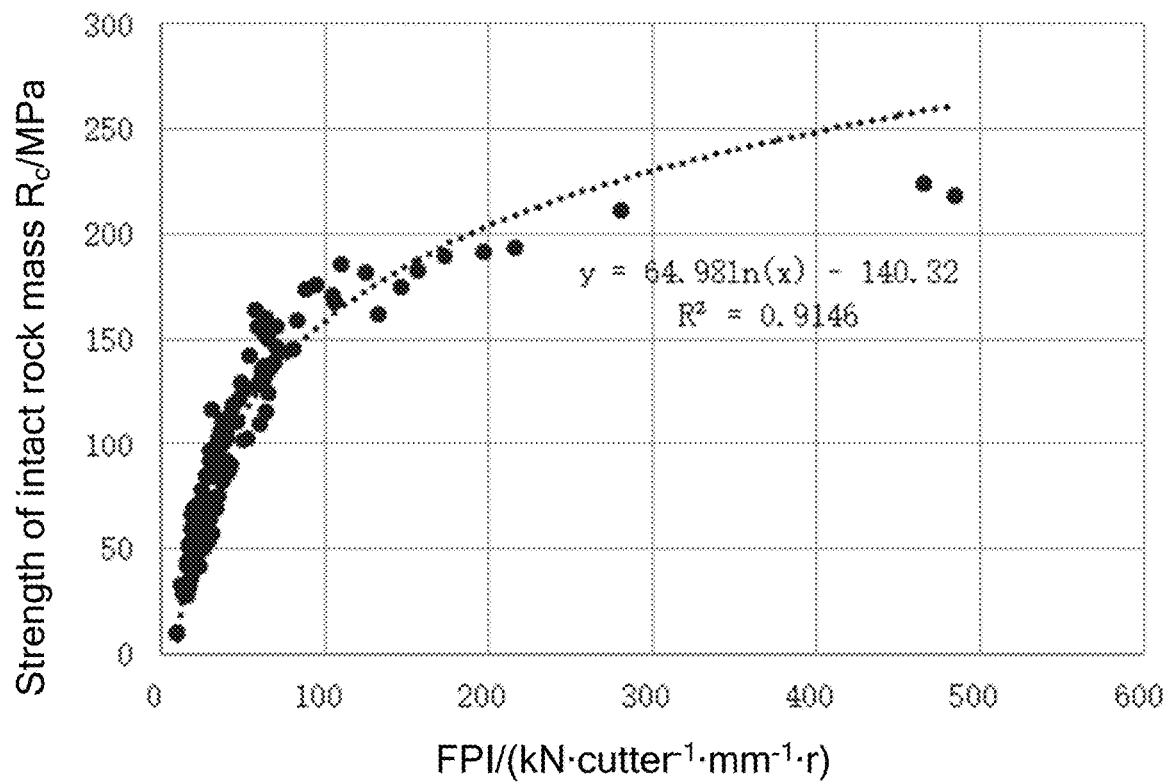
FIG. 2 is a relation diagram of an FPI of the TBM boring rock mass and intact rock mass strength $R_c$.

A flow block diagram of a method 10 for real-time strength estimation, grading, and early warning of rock mass in TBM tunneling provided by the present disclosure is shown in FIG. 1, and includes the following steps.

S1: A general relation model of equivalent strength $R_{ec}$ of the TBM boring rock mass and a field penetration index (FPI) is established as follow:

$$R_{ec}=64.981n(FPI)-140.32(R^2=0.9146) \quad \text{Formula (1).}$$

Determination steps of Formula (1) are as follows.

S1.1: Intact rock mass boring data and geological data of the TBM on site are obtained: the intact rock mass boring data and geological data of the TBM tunnel project under different tunnel diameter scales and different rock types are acquired. The boring data includes cutterhead thrust and penetration which are used to calculate the FPI. The geological data includes rock uniaxial compressive strength (UCS).

$$FPI=F/n\cdot p \quad \text{Formula (2),}$$

where F is the cutterhead thrust, kN, P is the penetration, mm/r, and n is a number of tools.

S1.2: Measured intact rock mass data at a project site is acquired, and a relation formula between the FPI and rock UCS is established using a mathematical regression method. The UCS of the rock mass is selected as the grading index of rock mass strength, and the rock UCS can be used as the UCS of the intact rock mass. Thus, a relation model of intact rock mass strength $R_c$ and the FPI can be obtained:

$$R_c = 64.981 \ln(FPI) - 140.32 \, (R^2 = 0.9146) \quad \text{Formula (3)}.$$

At a step 12, S1.3: strength of the boring rock mass with difficulty of boring penetration equivalent to difficulty of boring penetration of an intact rock mass is defined as the equivalent strength $R_{ec}$ of the TBM boring rock mass (suitable for both the intact rock mass and the jointed rock mass), that is, the model in Formula (1) is obtained.

S2: The model in Formula (1) is applied to TBM boring construction. The FPI is calculated according to boring parameters acquired by a TBM of a project under construction in real time. The equivalent strength $R_{ec}$ of the boring rock mass is calculated using the model in Formula (1). An integrity coefficient $K_v$ of the TBM boring rock mass is estimated combined with compressive strength of an intact rock mass of the project with same lithology measured by pre-sampling. This step specifically includes the following steps.

At a step 14, S2.1: the FPI of the boring rock mass is calculated according to the boring parameters acquired by a TBM data acquisition system of the project under construction in real time. At a step 16 the FPI calculated by Formula (2) is substituted into Formula (1) to obtain the equivalent strength $R_{ec}$ of the TBM boring rock mass.

At a step 18, S2.2: the integrity coefficient $K_v$ of the TBM boring rock mass is estimated in real time in a tunnel section with same lithology:

$$K_v = R_{ec}/R_c \quad \text{Formula (4)},$$

where $R_{ec}$ is the equivalent strength of the rock mass calculated according to the model in Formula (1), and $R_c$ is strength of the intact rock mass of the project with same lithology measured by pre-sampling.

At a step 20, S3: grading and early warning are performed on the TBM boring rock mass according to a given grading standard and early warning values based on the equivalent strength $R_{ec}$ and the integrity coefficient $K_v$ calculated using the model in Formula (1) in real time.

The grading standard and the early warning values are as follows.

When the equivalent strength $R_{ec}$ of the rock mass is greater than 150 MPa, a second-level early warning value of extremely hard surrounding rock is given.

When the equivalent strength $R_{ec}$ of the rock mass is greater than 200 MPa, a first-level early warning value of extremely hard surrounding rock is given.

When the equivalent strength $R_{ec}$ of the rock mass is less than 30 MPa and the integrity coefficient $K_v$ is less than 0.35, a second-level early warning value of weak and broken surrounding rock is given.

When the equivalent strength $R_{ec}$ of the rock mass is less than 15 MPa and the integrity coefficient $K_v$ is less than 0.35, a first-level early warning value of weak and broken surrounding rock is given.

Early warning is performed on the TBM boring rock mass according to the equivalent strength $R_{ec}$ of the TBM boring rock mass obtained in Formula (1), and specific grading and early warning are as follows.

When $R_{ec}$ is 30-150 MPa, a surrounding rock grade is B-I, penetration is easy with a low risk, and no early warning is required.

When $R_{ec}$ is 150-200 MPa, or $R_{ec}$ is 15-30 MPa and $K_v$ is less than 0.35, a surrounding rock grade is B-II, penetration is difficult or a risk of breakage is high, and a second-level early warning is given.

When $R_{ec}$ is greater than 200 MPa, or $R_{ec}$ is less than 15 MPa and $K_v$ is less than 0.35, a surrounding rock grade is B-III, penetration is extremely difficult or a risk of breakage is very high, and a first-level early warning is given.

A result calculated by the quasi rock mass strength method is compared with the estimated equivalent rock mass strength of the TBM boring rock mass in the present disclosure.

The quasi rock mass strength (rock mass integrity coefficient correction method) is an empirical method to determine the strength of rock mass. Its essence is to use some simple test index to correct the rock strength as the estimated value of rock mass strength. The calculation formula is shown as follows:

$$\sigma_{cm} = \left(\frac{V_{pm}}{V_{pr}}\right)^2 \sigma_{ci}, \quad \text{Formula (5)}$$

where $\sigma_{cm}$ is UCS of rock mass, $\sigma_{ci}$ is UCS of rock, $V_{pm}$ is an elastic p-wave velocity of rock mass, $V_{pr}$ is an elastic p-wave velocity of rock, and $(V_{pm}/V_{pr})^2$ is $K_v$, the integrity coefficient of rock mass. Structural planes such as joints and cracks are the main factors affecting the rock mass. The product of rock UCS and integrity coefficient (calculation of elastic wave velocity) is used as the estimated value of rock mass strength, which avoids many subjective factors. In addition, the method is simple.

Figure 3A:
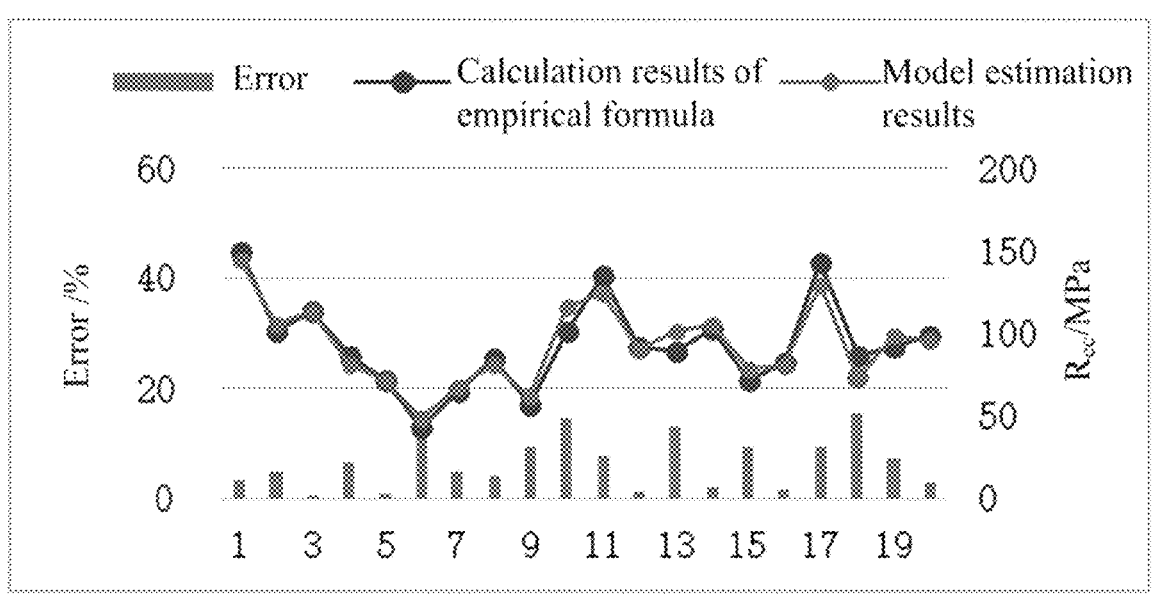
FIG. 3A-B are comparison result and error analysis diagram between equivalent strength $R_{ec}$ of a rock mass estimated by the model of the present disclosure and a result of an empirical formula of quasi rock mass strength in a specific project example.
Figure 3B:
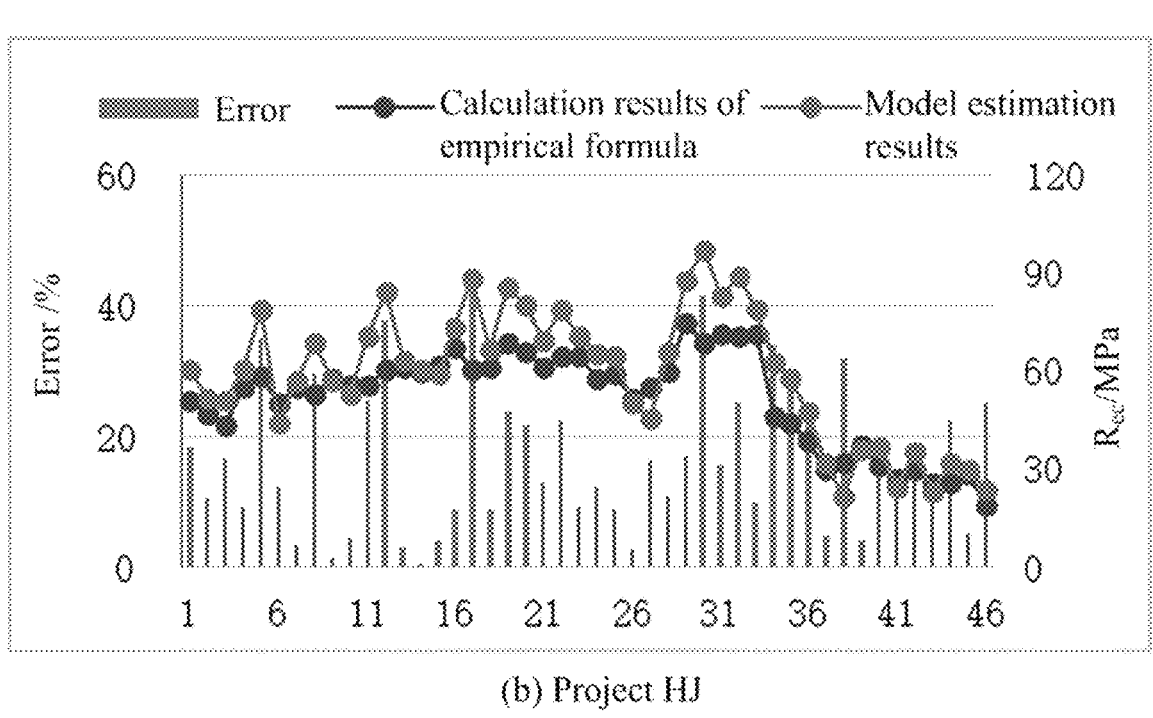

Taking the actual field data of a project in Northeast China and the HJ project as an example, the equivalent strength $R_{ec}$ of rock mass estimated by the present disclosure is compared with the calculation results of Empirical Formula (5) of quasi rock mass strength to verify the accuracy of the provided method. The comparison results and error analysis are shown in FIG. 3A-B.

An error analysis formula is as follows:

$$E = \left|\frac{R_{ec} - \sigma_{cm}}{\sigma_{cm}}\right| \times 100\%. \quad \text{Formula (6)}$$

Selection of Project Data:

Project in Northeast China (20 sets of data): granite; a UCS range of rock: 78-175 MPa; and an integrity coefficient of a rock mass (0.56-0.89).

Project HJ (46 sets of data): migmatite; a UCS range of rock: 74-107 MPa; and an integrity coefficient (0.24-0.72).

It can be seen from FIG. 3A-B that the $R_{ec}$ estimated by the model in Formula (1) of the present disclosure is compared with results calculated by the empirical formula, and the results of the project in Northeast China and the project HJ are close, with the mean error of 6.53% and 16.76%. The overall changing trends of the estimated results of the two methods are basically the same, and the error is relatively small. In practical engineering, from the overall changing trend of the comparison results and the error analysis, the accuracy of the model used in the present disclosure can meet the needs of engineering practice.

The accuracy of the present disclosure is verified by 5 specific application examples.

Example 1: Stake Number Sections of a Reservoir Diversion Project in Zhejiang Province: 15+916 to 15+716 (200 m)

Figure 4:
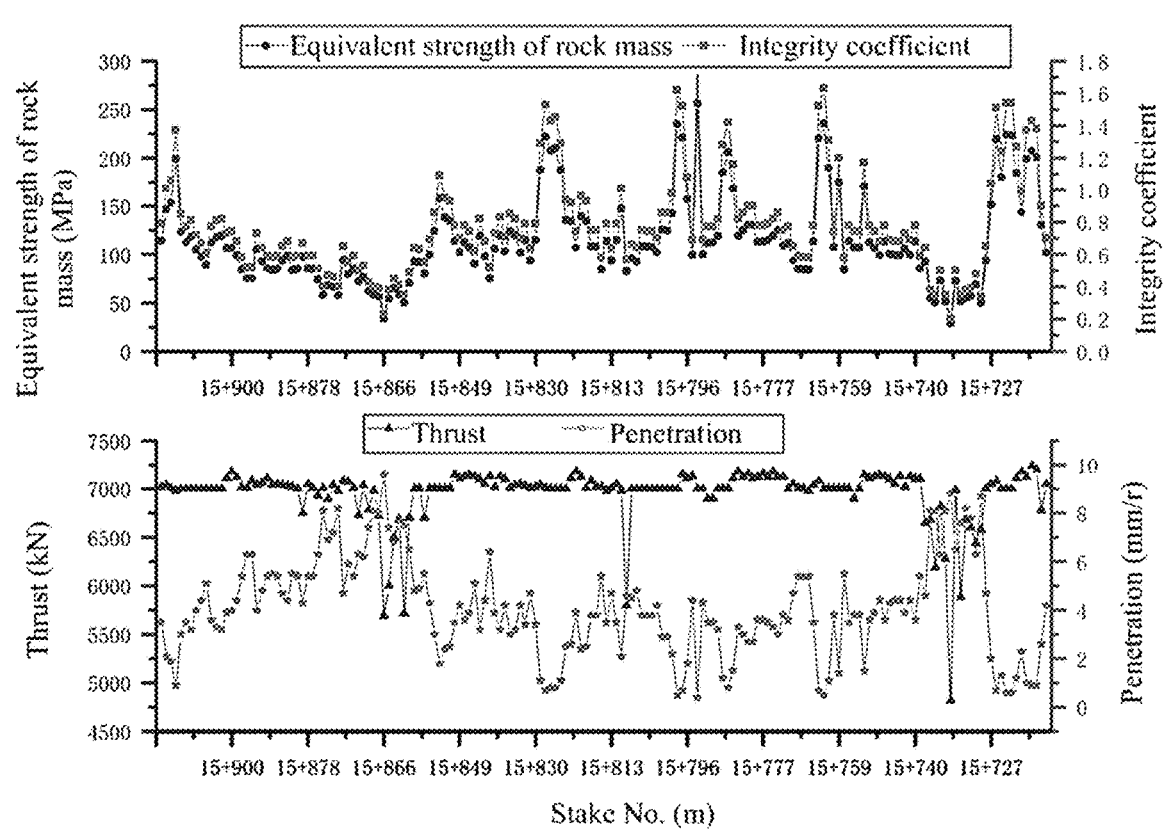
FIG. 4 is a changing trend diagram of equivalent strength and an integrity coefficient of a rock mass in Example 1.

Lithology: breccia fused tuff
Average compressive strength: 145 MPa
Surrounding rock class of the tunnel section divided on site: Class II
Actual rock mass conditions: the joint and crack of excavation face are not well developed, the structural plane is mainly closed, and the tunnel wall has excellent flatness. Surrounding rock integrity is excellent. There is no seepage. The self-stabilizing ability of surrounding rock in the unlined tunnel is strong. The surrounding rock at stake No. 15+870 to 15+760 and 15+732 to 15+726 is partially broken.
Support mode: there is no support. Local broken parts are supported with the hanging net and sprayed with insufflate concrete.
It can be seen from FIG. 4 that the thrust is basically maintained at 7,000 kN, and the penetration ranges from 0.5 to 8 mm/r with great changes. The equivalent strength of rock mass estimated based on Formula (3) ranges from 50 to 250 MPa, with an average value of 114 MPa. The stake sections 15+875 to 15+860 and 15+737 to 15+728 are affected by the integrity of rock mass, and the equivalent strength of rock mass is lower than that of the intact tunnel section, which is reflected in the TBM boring parameters, namely, the penetration increases and the thrust decreases. In addition, the field coring test values at 15+784, 15+737 and 15+724 are 175 MPa, 83.1 MPa, and 162 MPa respectively, and the corresponding penetration values are 1.3 mm/r, 6.3 mm/r, and 1.0 mm/r. The estimated values obtained using the model in Formula (1) of the present disclosure are 172 MPa, 94 MPa, and 184 MPa respectively. The rock mass in the rock coring tunnel section is intact, so the estimated equivalent strength of rock mass is the rock strength. The calculated value has little difference with the actual value, and the prediction of the model in the present disclosure is more accurate.

Under the same lithology, the ratio of the equivalent strength $R_{ec}$ of the rock mass to the strength $R_c$ of the intact rock mass (the average compressive strength under the lithology is taken here) is the integrity coefficient $K_v$ of the rock mass. Therefore, the equivalent strength of the rock mass and the integrity coefficient estimated based on the model in the present disclosure have the same change law. The surrounding rock at stake No. 15+875 to 15+860 and 15+737 to 15+728 is partially broken, and the corresponding integrity coefficient is small, ranging from 0.25 to 0.55. The integrity coefficient of rock mass under other stake numbers is higher, maintaining at least 0.55. Breccia fused tuff belongs to hard rock. The rock mass of surrounding rock class II is intact to relatively intact, and the integrity coefficient is at least 0.55. Therefore, the integrity coefficient $K_v$ calculated is consistent with the actual situation, and the changing trend of the integrity coefficient of surrounding rock is basically consistent with that of the actual rock mass condition.

Example 2

Stake number sections of a diversion project in Guangzhou City: 23+847 to 23+716 (131 m)

Figure 5:
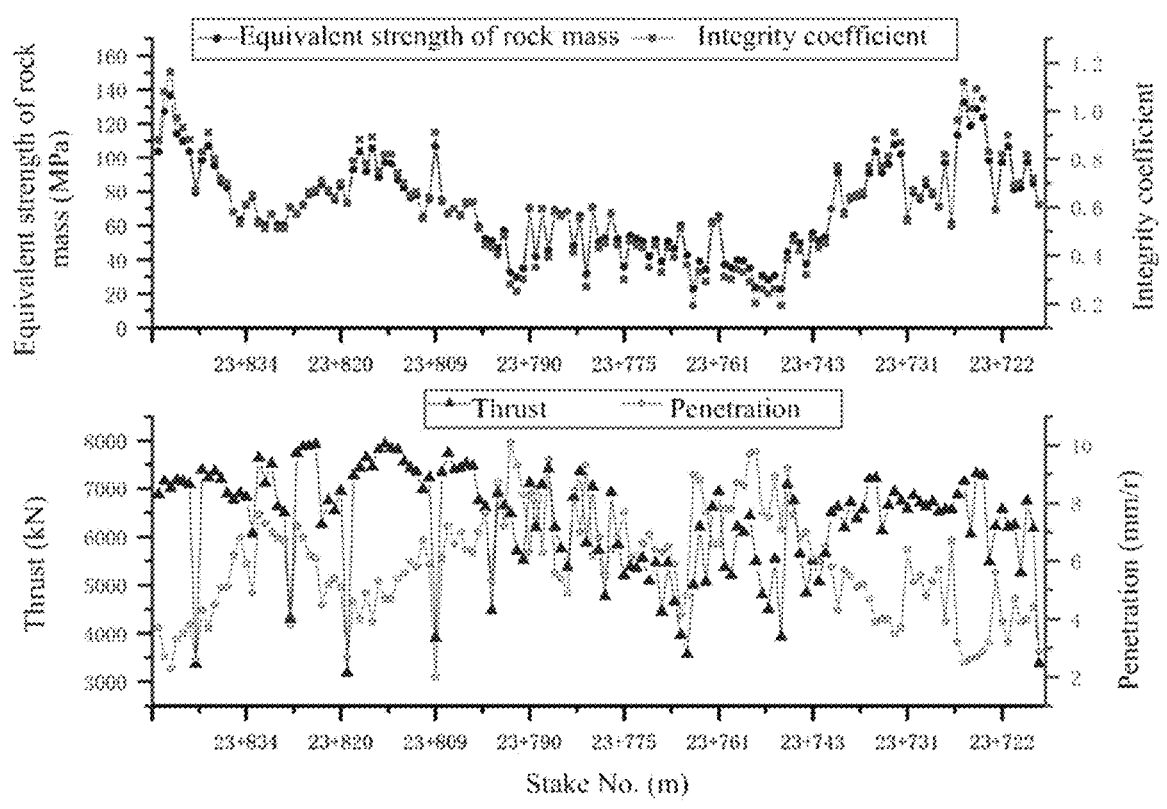
FIG. 5 is a changing trend diagram of equivalent strength and an integrity coefficient of a rock mass in Example 2.

Lithology: granite
Average rock strength: 118 MPa
Surrounding rock class of the tunnel section divided on site:
23+847 to 23+765 (82 m): Class II
23+765 to 23+743 (22 m): Class III
23+743 to 23+716 (27 m): Class II
Actual Rock Mass Conditions:
23+847 to 23+765 and 23+743 to 23+716: the rock is hard. The joint and crack of the excavation face are not developed, and the rock mass is intact to relatively intact. The surrounding rock is basically stable. The excavation face is dry.
23+765 to 23+743: the rock is hard. The joint and crack of the excavation face are developed, and the integrity of rock mass is poor. The surrounding rock is weakly differentiated and the local stability is poor. There is a small amount of dropping water locally.
Support Mode:
23+847 to 23+765 and 23+743 to 23+716: there is no support.
23+765 to 23+743: the system bolt plus reinforced mesh are used, and concrete is sprayed.
It can be seen from FIG. 5 that all parameters show regional distribution. The equivalent strength of rock mass at stake No. 23+847 to 23+800 and 23+743 to 23+716 is relatively high as a whole, with a change range of 60-136 MPa and an average value of 85 MPa, and the corresponding integrity coefficient is also relatively high, with a change range of 0.5-1.16 and an average value of 0.74. Both the equivalent strength and integrity coefficient of rock mass in the range of stake numbers 23+800 to 23+743 decrease. The average value of equivalent strength and integrity coefficient of rock mass obtained using the model in Formula (1) of the present disclosure are 50 MPa and 0.4 respectively. The changing trend of corresponding thrust is similar to that of equivalent strength of rock mass, and the penetration is opposite, indicating that higher equivalent strength of rock mass indicates more excellent integrity, and smaller penetration indicates greater thrust and higher difficulty of penetrating the rock mass. From the overall trend, the changes of the equivalent strength and integrity coefficient of rock mass are consistent with the actual rock mass conditions and support conditions. The estimated integrity coefficient of some areas (23+800 to 23+765) is lower than the range of the integrity coefficient (0.55-075) corresponding to the actual rock mass conditions, because this tunnel section belongs to deviation surrounding rock Class II, a transition section from surrounding rock Class II to class III.

Example 3: Stake Number Sections of a TBM Diversion Project in Xinjiang Uygur

Figure 6:
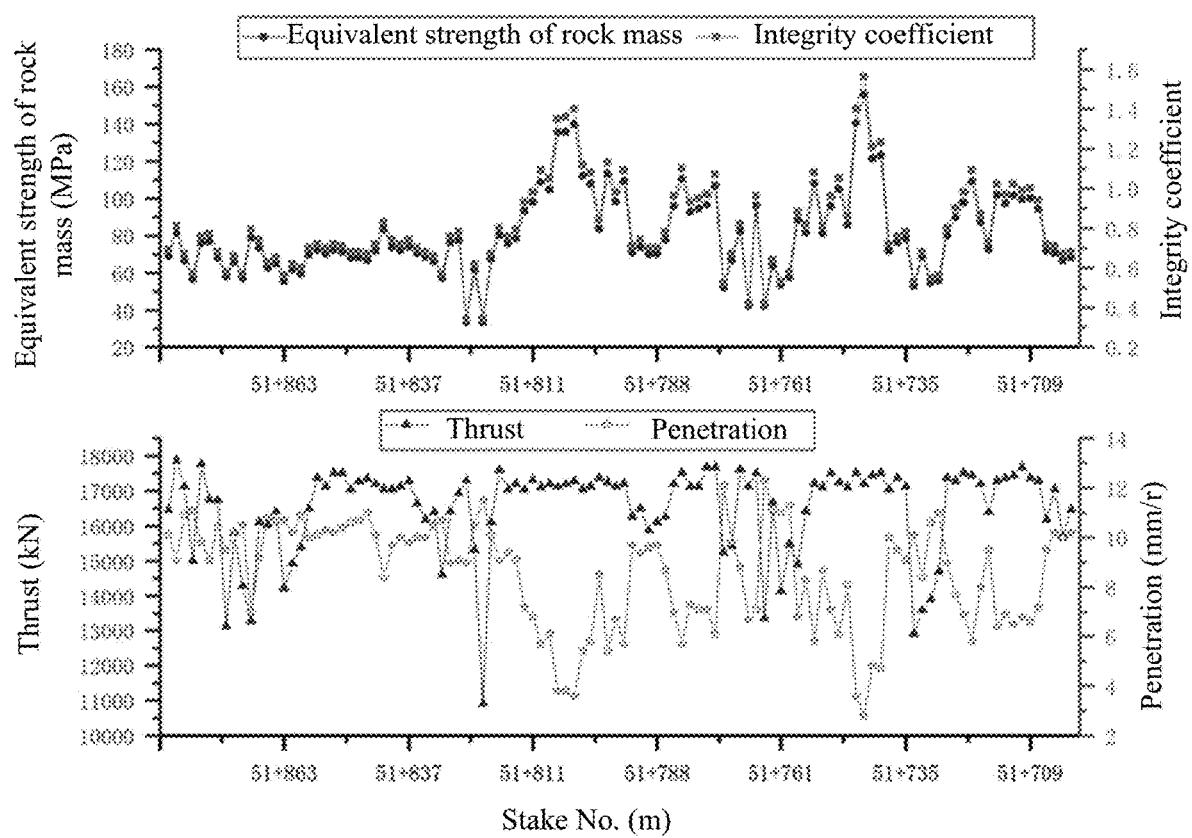
FIG. 6 is a changing trend diagram of equivalent strength and an integrity coefficient of a rock mass in Example 3.

Autonomous Region: 51+887 to 51+700 (187 m)
Lithology: tuffaceous sandstone
Average rock strength: 100 MPa
Surrounding rock class of the tunnel section divided on site: Class II
Actual rock mass conditions: the crack of the excavation face is not developed. The rock mass is intact.
Support mode: there is no support.
The data of the intact tunnel section Class II is selected for analysis. It can be seen from FIG. 6 that the thrust of this tunnel section is basically maintained at 17,000 kN, the average penetration is 8.58 mm/r, and the range of the calculated FPI is 20-50, indicating that TBM boring performance is excellent. Both the equivalent strength and integrity coefficient of rock mass obtained using the model in Formula (1) of the present disclosure are relatively high, and the equivalent strength of rock mass is basically maintained in the range of 50-130 MPa, with a large change, and the average value is 81 MPa. The integrity coefficient is basically maintained between 0.5 and 1.25, with an average value of 0.81. The integrity coefficient is high and the rock mass is relatively intact, which is suitable for TBM boring and has an excellent match with the site.

Example 4: Stake Number Sections of a TBM Diversion Project in Xinjiang Uygur

Autonomous Region: 63+624 to 63+791 (167 m)
Lithology: tuffaceous sandstone
Average rock strength: 100 MPa
Surrounding rock class of the tunnel section divided on site: Class IV
Actual rock mass conditions: the rock mass is broken, with many cracks. The surrounding rock stability is poor.
Support mode: the system bolt is used, and steel arch and reinforcement row are erected.

Figure 7:
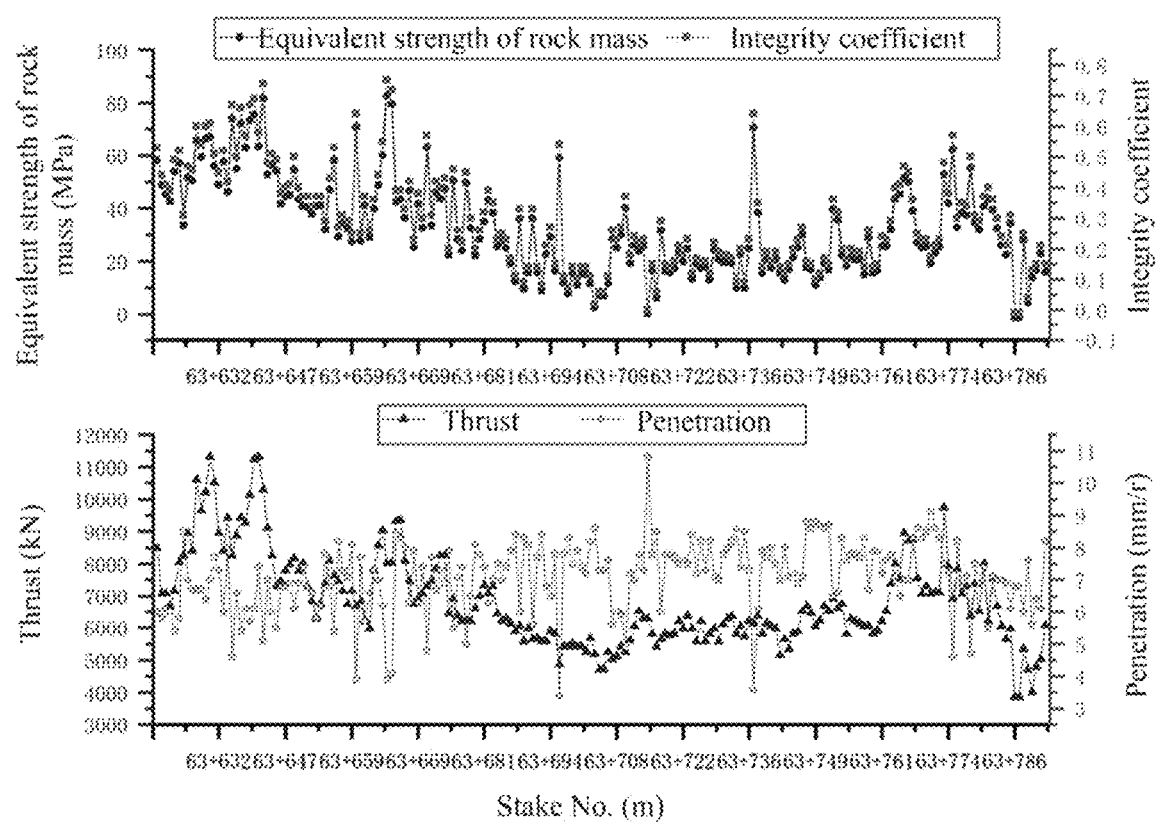
FIG. 7 is a changing trend diagram of equivalent strength and an integrity coefficient of a rock mass in Example 4.

As shown in FIG. 7, the average equivalent strength of rock mass corresponding to this tunnel section is 25 MPa. The average integrity coefficient is 0.25. Both the equivalent strength and integrity coefficient of rock mass are quite low. The average rock compressive strength of tuffaceous sandstone is 100 MPa, which belongs to the hard rock and the surrounding rock Class IV. The rock mass is broken, and the integrity coefficient of rock mass is generally less than 0.35. The estimated integrity coefficient of a small part of tunnel sections in the figure is between 0.25 and 0.55, which is relatively high. The results estimated using the model of the present disclosure are in consistent with those of the actual rock mass conditions. The corresponding average thrust of this tunnel section is 6,834 kN, the average penetration is 7.1 mm/r, and the average FPI is 15. Compared with Example 3, both the thrust and the penetration decrease, indicating that the surrounding rock in this tunnel section is broken, and although it is easy to bore and penetrate, the support amount increases. In order to adapt to the support, the boring parameters are actively controlled.

Example 5: Stake Number Sections of the Gaoligong Mountain Rail Tunnel on Dali-Ruili Railway: 225+504 to 225+410 (94 m)

Lithology: granite
Average rock strength: 53 MPa
Surrounding rock class of the tunnel section divided on site:
225+504 to 225+419 (85 m): Class IIIa
225+419 to 225+410 (9 m): Class IVa
Actual Rock Mass Conditions:
225+504 to 225+477: the surrounding rock is granite as a whole with the right side partially broken. The surrounding rock is weathered at 11 o'clock, the crack is relatively developed, and the groundwater is relatively developed.
225+477 to 225+419: the surrounding rock is granite as a whole with excellent integrity, the crack is not developed, and the groundwater is not developed.
225+419 to 225+410: the surrounding rock is granite as a whole with poor integrity, local strong weathering and quartz zone intrusion.
Support Mode:
225+504 to 225+419: Local broken parts are supported with the hanging net and sprayed with insufflate concrete.
225+419 to 225+410: the system bolt is used, the reinforced mesh is hung, and concrete is sprayed.

Figure 8:
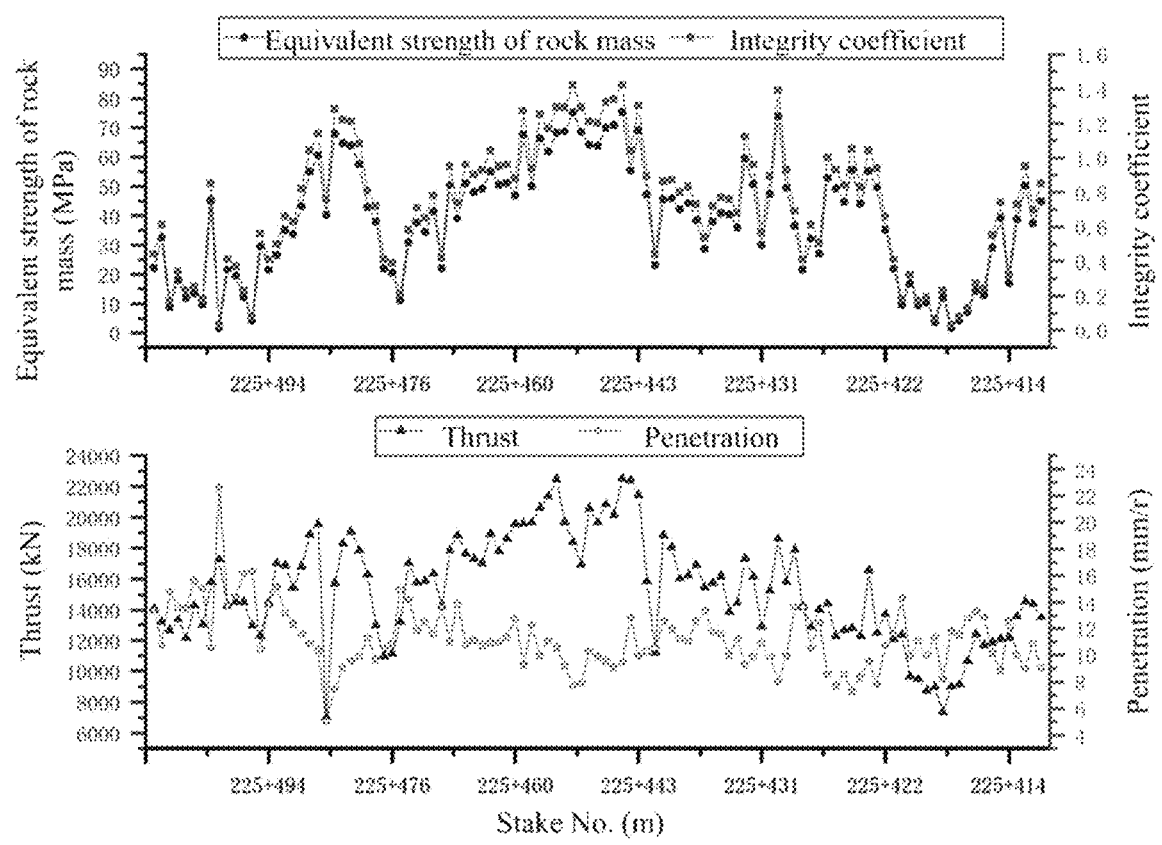
FIG. 8 is a changing trend diagram of equivalent strength and an integrity coefficient of a rock mass in Example 5.

It can be seen from FIG. 8 that the equivalent strength and integrity coefficient of rock mass show regional distribution. The surrounding rock at stake No. 225+504 to 225+421 is of Class IIIa. The integrity of the surrounding rock at tunnel sections 225+477 to 225+421 is relatively excellent, and the equivalent strength and integrity coefficient of rock mass are relatively high, with average values of 47.25 MPa and 0.89 respectively. The corresponding average thrust is 16,897 kN, the penetration is 10.74 mm/r and FPI is 18.68. The rock mass is in excellent condition and easy to bore and penetrate. However, the right side of surrounding rock in the 225+504 to 225+477 tunnel section is partially broken and the crack is relatively developed, so the equivalent strength and integrity coefficient of rock mass are relatively low, with average values of 30.8 MPa and 0.6 respectively. This is reflected in the TBM boring parameters, namely, the thrust decreases to 14,711 kN, the penetration increases to 12.5 mm/r, and the average FPI is 14.5. The surrounding rock at stake No. 225+421 to 225+410 is of Class IVa, and the integrity of the surrounding rock is poor, so both the corresponding equivalent strength and integrity coefficient of the rock mass are low, with average values of 19.88 MPa and 0.38 respectively. The corresponding average thrust is 11,202 kN, the penetration is 10.98 mm/r and FPI is 12.11. Compared with Class IIIa, the penetration of surrounding rock Class IVa is basically unchanged, and the thrust decreases, indicating that the rock in this tunnel section is weak and broken and the support is strengthened. Therefore, the overall changing trend of the equivalent strength and integrity coefficient of rock mass is basically consistent with the actual construction.

Through the verification of the above 5 typical application examples, it is found that the equivalent strength and integrity coefficient of TBM boring rock mass estimated by the general relation model in the present disclosure have excellent match with the actual rock mass conditions. It can be seen that the method for estimating the equivalent strength and integrity coefficient of rock mass provided herein is feasible.

In summary, the present disclosure can estimate the equivalent strength and integrity coefficient of TBM boring rock mass online, understand boreability and a degree of breakage of the TBM boring rock mass in real time and intuitively, judge boreability of surrounding rock in time, and perform early warning of a risk that the TBM is stuck due to rock mass collapse, so as to prepare appropriate support measures in advance and ensure the smooth progress of the project.

Many specific details are set forth in the above description to facilitate full understanding of the present disclosure, but the present disclosure may also be implemented in other ways different from those described herein, similar derivatives may be made by those skilled in the art without departing from the connotation of the present disclosure, and therefore, the present disclosure is not limited by the specific embodiments disclosed below.

What is claimed is:
1. A method for real-time strength estimation, grading, and early warning of rock mass in tunnel boring machine (TBM) tunneling, comprising the following steps:
providing a TBM boring construction including a tunnel boring machine that is tunneling in a TBM boring rock mass;

S1: establishing a general relation model of equivalent strength $R_{ec}$ of the TBM boring rock mass and a field penetration index (FPI) as follow:

$$R_{ec}=64.981\ln(FPI)-140.32 \quad \text{Formula (1)},$$

wherein a determination coefficient of Formula (1) is $R^2=0.9146$;

S2: applying the model in Formula (1) to TBM boring construction, acquiring boring parameters of the TBM boring construction in real time, calculating the FPI according to the boring parameters, calculating the equivalent strength $R_{ec}$ of the boring rock mass using the model in Formula (1), and estimating an integrity coefficient $K_v$ of the TBM boring rock mass combined with compressive strength of an intact rock mass of the project with same lithology measured by pre-sampling;

S3: performing grading and early warning on the TBM boring rock mass according to a given grading standard and early warning values based on the equivalent strength $R_{ec}$ and the integrity coefficient $K_v$ calculated using the model in Formula (1) in real time; and S4: identifying a breakage degree of the TBM boring rock mass based on the graded TBM boring rock mass and adjusting the boring parameters and applying a supporting protection to the TBM boring rock mass with a risk of rock mass collapse of the TBM boring construction according to the breakage degree of the TBM boring rock mass.

2. The method for real-time strength estimation, grading, and early warning of rock mass in TBM tunneling according to claim 1, wherein the model in Formula (1) in step S1 are determined as follows:

S1.1: obtaining intact rock mass boring data and geological data of the TBM on site: acquiring the intact rock mass boring data and geological data of the TBM tunnel project under different tunnel diameter scales and different rock types, wherein the boring data comprises cutterhead thrust and penetration which are used to calculate the FPI; and the geological data comprises rock uniaxial compressive strength (UCS):

$$FPI = \frac{F}{n \cdot P}, \quad \text{Formula (2)}$$

wherein F is the cutterhead thrust, in kiloNewtons (kN); P is the penetration, in millimeters per rotation (mm/r); and n is a number of tools;

S1.2: acquiring measured intact rock mass data at a project site, and establishing a relation formula between the FPI and rock UCS using a mathematical regression method, so as to obtain a relation model of intact rock mass strength $R_c$ and the FPI:

$$R_c 32\ 64.981\ln(FPI)-140.32(R^2=0.9146) \quad \text{Formula (3); and}$$

S1.3: defining strength of the boring rock mass with difficulty of boring penetration equivalent to difficulty of boring penetration of an intact rock mass as the equivalent strength $R_{ec}$ of the TBM boring rock mass, that is, obtaining the model in Formula (1).

3. The method for real-time strength estimation, grading, and early warning of rock mass in TBM tunneling according to claim 1, wherein step S2 comprises the following sub-steps:

S2.1: calculating the FPI of the boring rock mass according to the boring parameters acquired by a TBM data acquisition system of the project under construction in real time, and substituting the FPI calculated by Formula (2) into Formula (1) to obtain the equivalent strength $R_{ec}$ of the TBM boring rock mass; and S2.2: estimating the integrity coefficient $K_v$ of the TBM boring rock mass in real time in a tunnel section with same lithology:

$$K_v = R_{ec}/R_c \quad \text{Formula (4)},$$

wherein $R_{ec}$ is the equivalent strength of the rock mass calculated according to the model in Formula (1), and $R_c$ is strength of the intact rock mass of the project with same lithology measured by pre-sampling.

4. The method for real-time strength estimation, grading, and early warning of rock mass in TBM tunneling according to claim 1, wherein the grading standard and the early warning values are as follows:

when the equivalent strength $R_{ec}$ of the rock mass is greater than 150 MPa, a second-level early warning value of extremely hard surrounding rock is given;

when the equivalent strength $R_{ec}$ of the rock mass is greater than 200 MPa, a first-level early warning value of extremely hard surrounding rock is given;

when the equivalent strength $R_{ec}$ of the rock mass is less than 30 MPa and the integrity coefficient $K_v$ is less than 0.35, a second-level early warning value of weak and broken surrounding rock is given; and when the equivalent strength $R_{ec}$ of the rock mass is less than 15 MPa and the integrity coefficient $K_v$ is less than 0.35, a first-level early warning value of weak and broken surrounding rock is given.

5. The method for real-time strength estimation, grading, and early warning of rock mass in TBM tunneling according to claim 4, wherein TBM boring rock mass grading and early warning are as follows:

when $R_{ec}$ is 30-150 MPa, a surrounding rock grade is B-I, penetration is easy with a low risk, and no early warning is required;

when $R_{ec}$ is 150-200 MPa, or $R_{ec}$ is 15-30 MPa and $K_v$ is less than 0.35, a surrounding rock grade is B-II, penetration is difficult or a risk of breakage is high, and a second-level early warning is given; and when $R_{ec}$ is greater than 200 MPa, or $R_{ec}$ is less than 15 MPa and $K_v$ is less than 0.35, a surrounding rock grade is B-III, penetration is extremely difficult or a risk of breakage is very high, and a first-level early warning is given.

* * * * *